(12) United States Patent
Morioka

(10) Patent No.: US 10,264,220 B2
(45) Date of Patent: Apr. 16, 2019

(54) DISPLAY IMAGE SWITCHING DEVICE AND DISPLAY METHOD

(75) Inventor: Mikio Morioka, Fukuoka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 1388 days.

(21) Appl. No.: 13/503,763

(22) PCT Filed: Oct. 21, 2010

(86) PCT No.: PCT/JP2010/006245
§ 371 (c)(1),
(2), (4) Date: Apr. 24, 2012

(87) PCT Pub. No.: WO2011/052165
PCT Pub. Date: May 5, 2011

(65) Prior Publication Data
US 2012/0206607 A1    Aug. 16, 2012

(30) Foreign Application Priority Data

Oct. 27, 2009  (JP) ................................ 2009-246954
Mar. 1, 2010   (JP) ................................ 2010-044182

(51) Int. Cl.
   *H04N 7/18*    (2006.01)
   *H04N 5/247*   (2006.01)

(52) U.S. Cl.
   CPC ............. *H04N 7/181* (2013.01); *H04N 5/247* (2013.01)

(58) Field of Classification Search
   CPC ........ H04N 7/181; H04N 5/232; H04N 5/247; G08B 13/19645; G08B 13/19693
   (Continued)

(56) References Cited

U.S. PATENT DOCUMENTS

2002/0136432 A1  9/2002  Koike et al.
2008/0129825 A1  6/2008  DeAngelis et al.
(Continued)

FOREIGN PATENT DOCUMENTS

CN   101129071    2/2008
JP   2000-307928  11/2000
(Continued)

OTHER PUBLICATIONS

Search report from E.P.O., dated Mar. 19, 2013.

*Primary Examiner* — Mehrdad Dastouri
*Assistant Examiner* — Kristin Dobbs
(74) *Attorney, Agent, or Firm* — Greenblum & Bernstein, P.L.C.

(57) ABSTRACT

A display image switching device lightens the burden imposed upon an operator, when selecting a particular camera from a plurality of cameras accompanying movement, by providing an intuitive and easy to understand selecting method. When an operator selects an object from an image picked-up and displayed on a display by a camera selected from a plurality of cameras by a camera, selector, a camera extractor extracts all other cameras picking-up the selected object. A camera icon generator arranges camera icons at positions on the displayed image where the extracted cameras are located. When a camera icon displayed on the display is selected, an image picked-up by the camera at the position of the selected camera icon is displayed on the display.

16 Claims, 16 Drawing Sheets

(58) Field of Classification Search
USPC ......................................................... 348/159
See application file for complete search history.

(56) References Cited

U.S. PATENT DOCUMENTS

2009/0079831 A1    3/2009  Sethuraman et al.
2009/0262206 A1*  10/2009  Park ........................... 348/218.1
2009/0268032 A1   10/2009  Jones et al.

FOREIGN PATENT DOCUMENTS

| JP | 2001-008194 | 1/2001 |
| JP | 2002-152713 | 5/2002 |
| JP | 2004-056664 | 2/2004 |
| JP | 3679620 | 8/2005 |
| JP | 2007-523545 | 8/2007 |
| JP | 2008-244946 | 10/2008 |
| JP | 2009-060201 | 3/2009 |
| WO | 2008/070687 | 6/2008 |
| WO | 2009/038994 | 3/2009 |

* cited by examiner

| INTRA-IMAGE COORDINATES | DECLINATION(POLAR COORDINATE SYSTEM) WHOSE INITIAL LINE IS OPTICAL AXIS (SEMI-STRAIGHT LINE OA) |
|---|---|
| ( ai, bi ) | ($\theta_i$, $\phi_i$) |
| : | : |
| (a0, b0) | ($\theta_0$, $\phi_0$) |
| : | : |
| (a1, b1) | ($\theta_1$, $\phi_1$) |
| : | : |

FIG.6

| INTRA-IMAGE AREA SIZE | DISTANCE TO OBJECT |
|---|---|
| ( a_i, b_i ) | r_i |
| : | : |
| (a_0, b_0) | r_0 |
| : | : |
| (a_1, b_1) | r_1 |
| : | : |

FIG.7

DISPLAY IMAGE SWITCHING DEVICE AND DISPLAY METHOD

TECHNICAL FIELD

The present invention relates to a display image switching apparatus and a display method that switches between display images picked up using a plurality of cameras such as wearable cameras.

BACKGROUND ART

Conventionally, security of safes of financial institutions, companies' confidential storage locations, banks and various shops such as convenience stores where ATMs (automated teller machines) are set up is maintained using moving images and still images of a object to be monitored picked up by surveillance cameras set up therein.

A technology disclosed in Patent Literature 1 is known as such an image pickup system using a stationary camera. Patent Literature 1 discloses a technology as shown in FIG. 1 that displays a camera icon indicating the position, orientation and image-pickup range of a camera on a planar map showing various stores and displays, when a user selects the camera icon displayed, images picked up by the selected camera along with the planar map.

Such a crime prevention system using a stationary camera may not be able to sufficiently pick up images of countenance, height, clothes or the like of the object to be monitored depending on the image-pickup direction of the camera or sufficiently collect information on the object to be monitored. Moreover, such a system cannot be used in an open space such as outdoors where it is difficult to set up the stationary camera. For this reason, in recent years, as disclosed in Patent Literature 2, guards, company employees, salesclerks at shops or the like may be provided with wearable cameras attached to their bodies (head, chest pockets or the like) to guard security locations and keep watch on suspicious individuals using images picked up during guarding.

Furthermore, a technology disclosed in Patent Literature 3 is a technology that manages, when monitoring a wide area using a plurality of moving cameras linked with one another, the positions and photographing directions of the moving cameras, thereby extracts a plurality of moving cameras photographing the same object and displays the object photographed by the plurality of moving cameras. This allows position information acquired by a camera in the best photographing situation to be shared among the cameras and thereby facilitates keeping track of the object.

Furthermore, the technology disclosed in Patent Literature 4 is a technology that selects, when a user specifies a point to be viewed, a camera which can photograph the point ahead of any camera else. This allows an administrator to view any desired object or location to be viewed using a simple method even when a plurality of cameras exist.

CITATION LIST

Patent Literature

PTL 1
Japanese Patent No. 3679620
PTL 2
Japanese Patent Application Laid-Open No. 2007-523545
PTL 3
Japanese Patent Application Laid-Open No. 2004-056664
PTL 4
Japanese Patent Application Laid-Open No. 2000-307928

SUMMARY OF INVENTION

Technical Problem

According to the technology disclosed in above Patent Literature 2, when monitoring a wide area, an operator may control a plurality of wearable cameras and switch between areas or objects to be monitored. However, Patent Literature 2 does not disclose a method of selecting a particular camera from among the plurality of cameras or a method of switching between images picked up by the selected camera, and such methods of implementation are unknown.

Furthermore, in the technology disclosed in above Patent Literature 1, it may be easily thought of to replace the stationary camera by a wearable camera. However, since the camera icon moves freely on the planar map, the operator must select a camera while considering the position and orientation of the camera, which increases the burden on the operator. Furthermore, the operator selects a camera on the planar map and views images picked up by the selected camera, which causes the operator's line of sight to frequently move between the planar map and picked-up images and increases the burden on the operator in this respect, too.

Furthermore, although Patent Literature 3 discloses that in an administration center, the camera positions are mapped on the planar map and displays video of each camera, Patent Literature 3 does not disclose a method of selecting a specific image from among a plurality of camera images or switching between the selected camera images.

Furthermore, the technology disclosed in Patent Literature 4 discloses that a supervisor selects a location and extracts a camera capable of photographing the selected location ahead of any camera else, but when the supervisor wants to view a object from a different angle from the state in which the object or location is selected, the supervisor needs to select the location or direction from the overall map again, and Patent Literature 4 does not disclose a method of changing the camera to another camera using simple means.

It is an object of the present invention to provide an intuitive and easy-to-understand selecting method when selecting a particular camera from among a plurality of cameras and thereby provide a display image switching apparatus and a display method that lightens the burden imposed on an operator.

Solution to Problem

One aspect of a display image switching apparatus according to the present invention includes an image selection section that displays an image picked up by a first camera among a plurality of cameras, a object selection section that selects a object in the displayed image, a camera extraction section that extracts a camera photographing the object selected by the object selection section from among the plurality of cameras as a second camera, a camera position calculation section that calculates a position on the displayed image of the second camera, and a camera position image information generation section that generates selectable camera position image information which indicates the position of the second camera, wherein the camera position image information generation section displays the camera position image information in association with the image selected by the image selection section and the image selection section displays, when the camera position image information is selected, the image photographed by the second camera.

One aspect of a display method according to the present invention includes an image selecting step of displaying an image picked up by a first camera among a plurality of cameras, a object selecting step of selecting a object in the displayed image, a camera extracting step of extracting a camera photographing the object selected from among the plurality of cameras as a second camera, a camera position calculating step of calculating a position of the second camera, and a camera position image information generating step of generating selectable camera position image information which indicates the position of the second camera, wherein in the camera position image information generating step, the camera position image information is displayed in association with the image selected in the image selecting step, and in the image selecting step, when the camera position image information is selected, the image photographed by the second camera is displayed.

Advantageous Effects of Invention

The present invention can select a particular camera from among a plurality of cameras accompanying movement in an intuitive and easy-to-understand manner, and can thereby lighten the burden imposed on the operator.

BRIEF DESCRIPTION OF DRAWINGS

FIG. 6 shows a correspondence relationship between intra-image coordinates and a declination whose initial line is the optical axis;

FIG. 7 shows a correspondence relationship between an intra-image area size and a distance to a object;

DESCRIPTION OF EMBODIMENTS

Hereinafter, embodiments of the present invention will be described in detail with reference to the accompanying drawings.

Wearable cameras according to the present invention are used attached to the bodies (head, chest pockets or the like) of a plurality of people (guards, company's employees, salesclerks of shops or the like) who guard various shops and venues such as event venues, exposition venues, station premises, safes in financial institutions, companies' confidential storage locations, banks, department stores, convenience stores, while picking up images. Wearable cameras are particularly useful in open spaces such as outdoor event venues where it is difficult to set up stationary cameras.

Wearable cameras need not always be attached to people, but may also be carried about by people for image pickup or attached to a robot capable of autonomous traveling. That is, wearable cameras can be paraphrased as "moving cameras."

Embodiment 1

FIG. 2 is a conceptual diagram of an overview of a monitoring system according to Embodiment 1 of the present invention. Here, a case will be described where images picked up by a plurality of wearable cameras (hereinafter simply referred to as "camera") are controlled in a centralized manner and displayed, for example, on a monitoring screen viewed by an operator such as a supervisor in a security guards room or the like. Each camera is assigned an ID (camera ID). In FIG. 2, planar map 11 showing a monitoring area of various shops is displayed on the right side of monitoring screen 10 and the positions of the cameras attached to guards and the fields of view of the cameras are displayed together with guard icons indicating the guards on planar map 11. In FIG. 2, there are cameras with camera IDs=2, 5, 6, 7 and 8.

On the other hand, camera image 12 picked up by camera selected by the operator is displayed on the left side of monitoring screen 10. In FIG. 2, picked-up image are displayed in an ellipsoidal display area, but without being limited to the ellipsoidal display, a circular display or square display may also be used.

Figure 1:
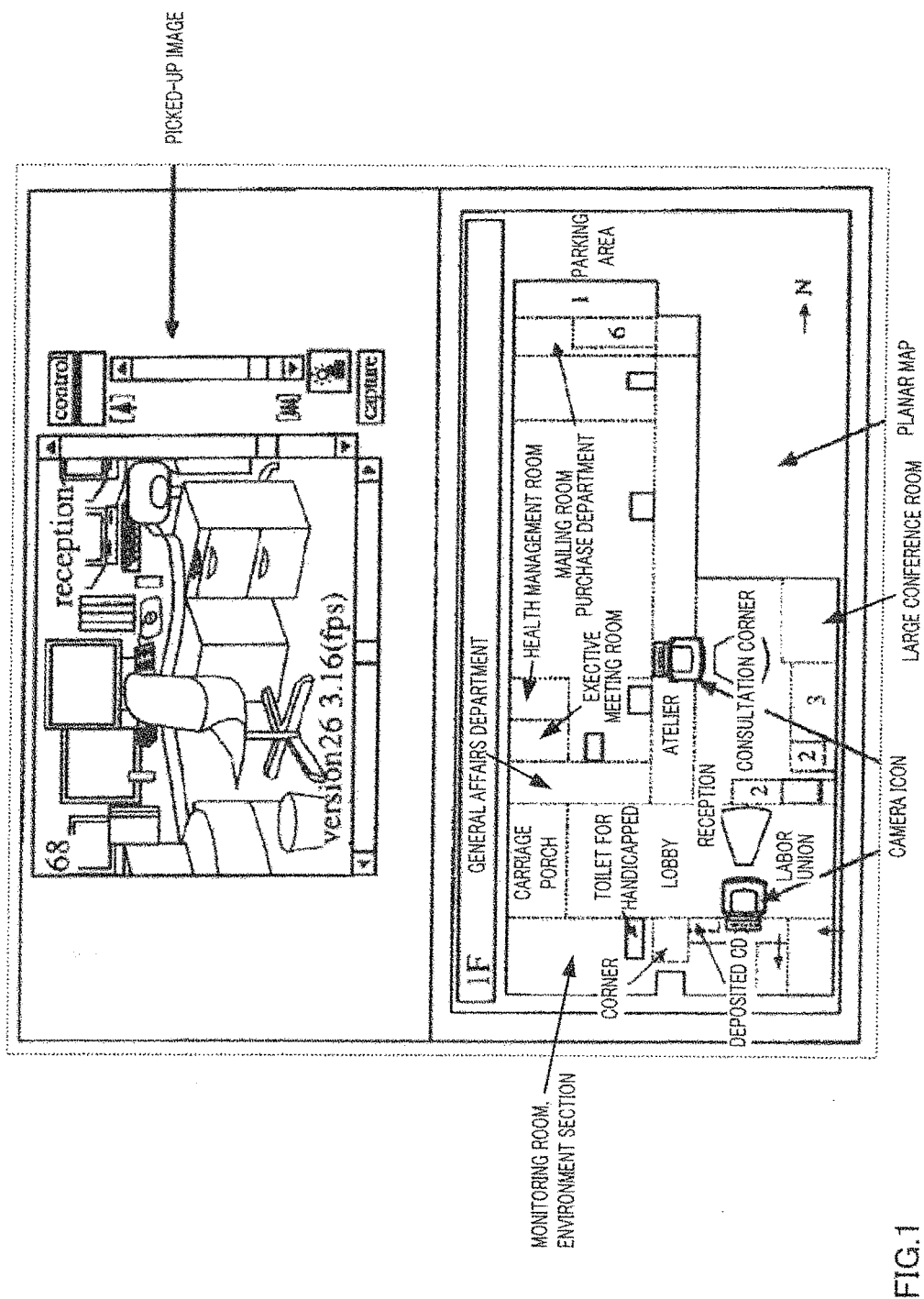
FIG. 1 shows a display image in an image pickup system disclosed in Patent Literature 1.
Figure 2A:
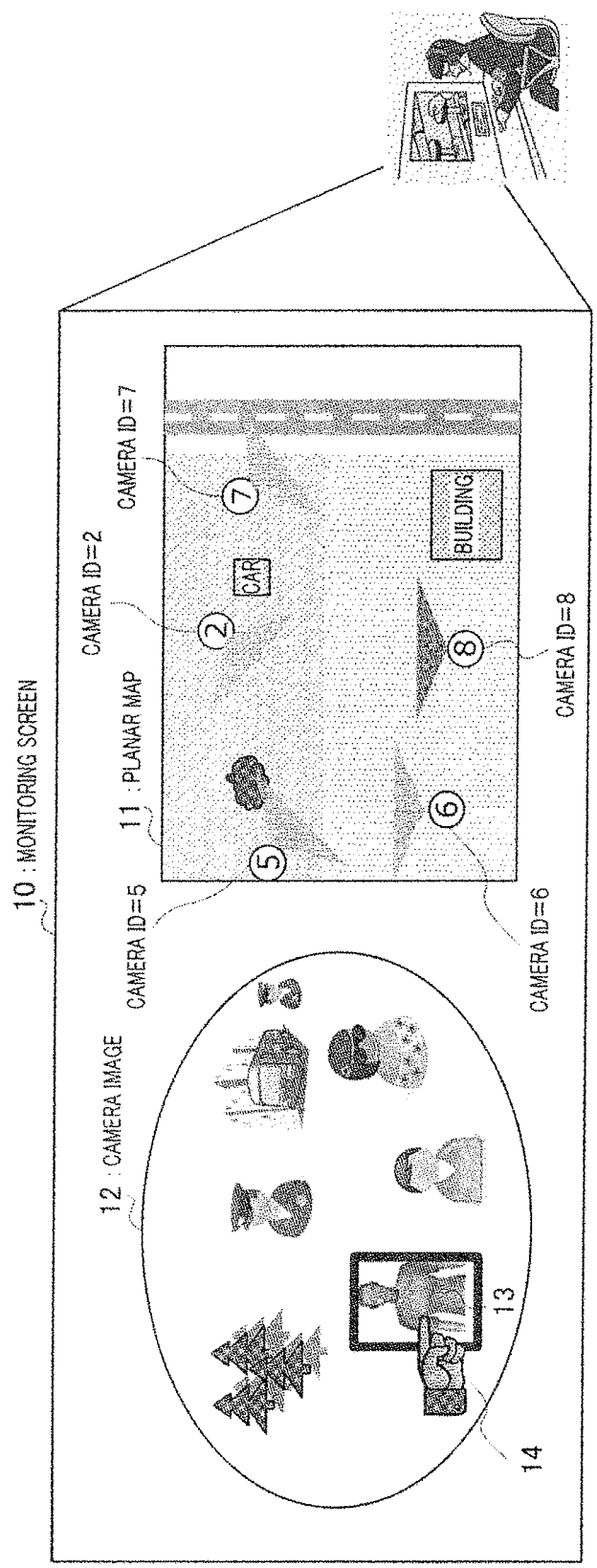
FIG. 2A is a conceptual diagram of an overview of a monitoring system of Embodiment 1.
Figure 2B:
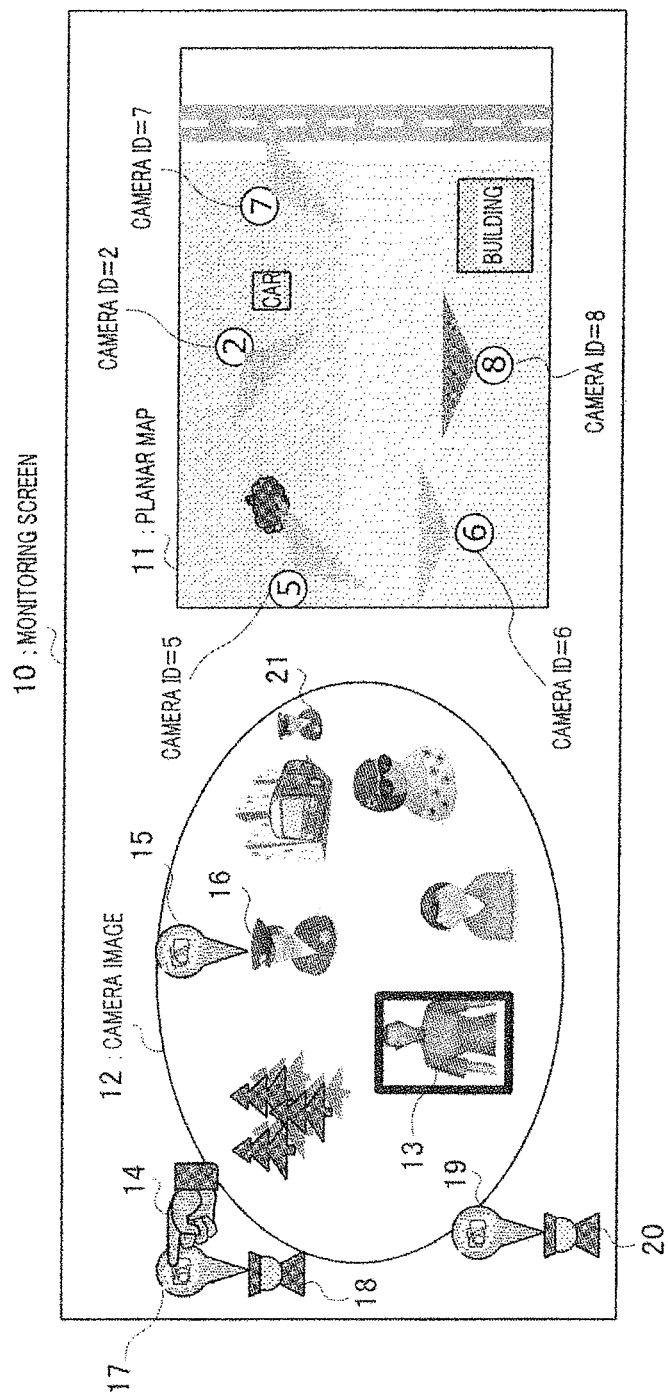
FIG. 2B is a conceptual diagram of an overview of the monitoring system of Embodiment 1.

FIG. 2A shows a situation in which images picked up by the camera with camera ID=8 are displayed in camera image 12 on the left side of monitoring screen 10 and the operator selects certain object 13 (here a figure enclosed by a frame) using pointer 14.

when the operator selects a certain object, this monitoring system extracts the camera picking up an image of the selected object and displays an icon indicating that the extracted camera exists near a guard attaching the camera. FIG. 2B shows this situation. Here, camera icon 15 indicating camera ID=2 is displayed near guard 16 displayed in camera image 12. At this time, if a camera outside the display area of the picked-up image is extracted, a figure icon indicating a guard and a camera icon are displayed outside the display area of the picked-up image. In FIG. 2B, camera icon 17 indicating camera ID=5 and figure icon 18 indicating a guard are displayed, and camera icon 19 indicating camera ID=6 and figure icon 20 indicating a guard are displayed. Such displays help the operator intuitively understand where selectable cameras are located in the monitoring space.

Furthermore, when the figure icons indicating guards and the camera icons are displayed, the size of the figure icon may be changed according to the distance between the camera with camera ID=8 and the guard, and when this distance is small, the figure icon is displayed in a large size and when the distance is large, the figure icon is displayed in a small size. Furthermore, the camera icon may also be displayed by likewise changing the size according to the distance irrespective of whether or not it is fitted in the display area of camera image 12.

Furthermore, the figure icon or camera icon may be displayed so as to be able to recognize the image-pickup direction of the camera. For example, it is possible to visually recognize the image-pickup direction of the camera displayed with an icon by displaying an arrow indicating the image-pickup direction of the camera or providing a plurality of icons for different directions and then changing the icon according to the image-pickup direction. Furthermore, information on the camera ID may be displayed superimposed on the camera icon.

Here, even in the case of a guard appearing in the picked-up image, if the guard's camera does not pick up an image of the selected object, the camera is not extracted and no camera icon is displayed. That is, in FIG. 2B, since the camera with camera ID=7 is not extracted, the camera icon is not displayed although guard 21 attaching this camera appears in camera image 12.

Figure 2C:
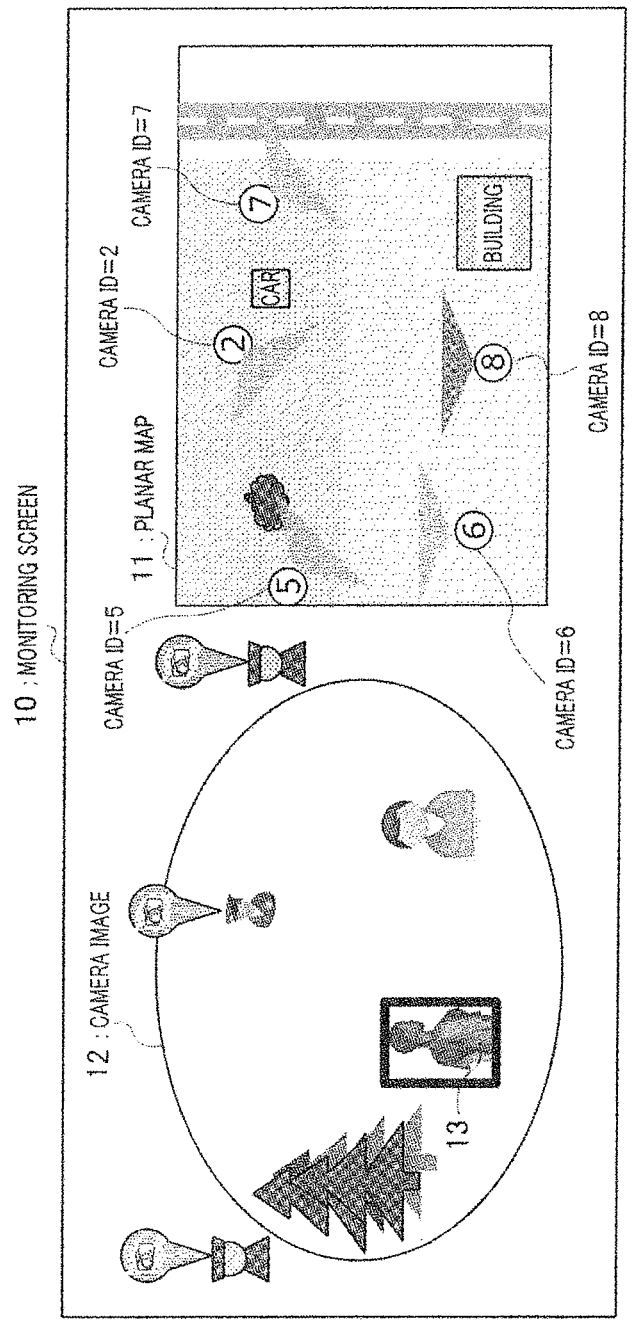
FIG. 2C is a conceptual diagram of an overview of the monitoring system of Embodiment 1.

In FIG. 2B, when the operator selects camera icon 17 with camera ID=5 in camera image 12 on the left side of the monitoring screen, camera image 12 on the left side of the monitoring screen is changed to camera image 12 with camera ID=5. FIG. 2C shows the situation in which the picked-up image is changed. At this time, the state in which the selected object in FIG. 2A may remain selected and the icon of the camera picking up an image of the object may be displayed or the object may be deselected so that a object may be selected again.

This allows the operator to intuitively select a camera to be viewed through an intuitive and easy-to-understand operation of selecting an icon while watching monitoring screen 10. Furthermore, since there is no need for referring to planar map 11 when changing the camera, it is possible to reduce the burden on the operator due to movement of the line of sight and continuously display a object of interest to the operator. Furthermore, since only cameras suitable for monitoring of a object are displayed, it is possible to switch between cameras and improve operability. This is particularly effective when monitoring a object from various angles.

As shown in the prior arts, the operator may also specify a guard icon on planar map 11 on the right side of monitoring screen 10 using pointer 14 so as to change camera image 12 on the left side of monitoring screen 10.

Figure 3:
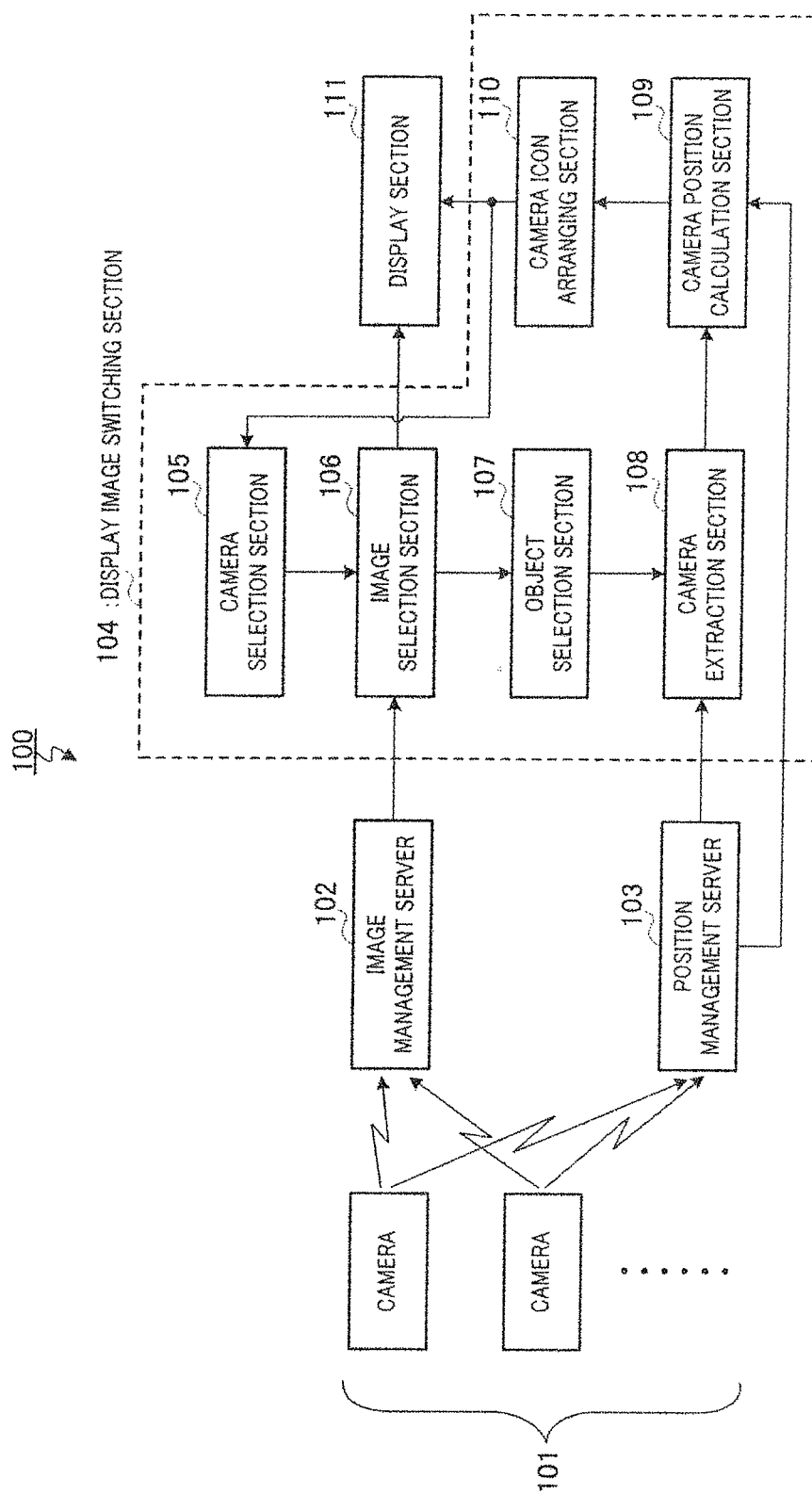
FIG. 3 is a block diagram of a configuration of the monitoring system of Embodiment 1.

FIG. 3 is a block diagram of a configuration of monitoring system 100 according to Embodiment 1 of the present invention. Hereinafter, components of the monitoring system 100 will be described with reference to FIG. 3.

Camera 101 measures the position of the camera in a real space and the image-pickup direction in which the camera is oriented and acquires the measurement results as position information and direction information. The position information is acquired using, for example, GPS (Global Positioning System) or wireless tag. On the other hand, the direction information is acquired using, for example, a gyro, a geomagnetic sensor or a landmark whose position is known. Furthermore, camera 101 includes an image pickup device such as CMOS or CCD that photoelectrically converts light of an object that enters via a lens to an image-pickup signal, applies predetermined processing to the picked-up image and processes the image into image data.

Furthermore, cameras 101 are assigned different camera IDs. Furthermore, camera 101 transmits the acquired image data and camera ID to image management server 102 through radio communication and transmits the camera ID, position information and direction information to position management server 103 through radio communication. Suppose the optical axis direction of the lens of camera 101 is the image-pickup direction of the camera.

Image management server 102 receives and stores the camera IDs and image data transmitted from cameras 101, manages image data per camera in association with the camera ID and outputs the stored image data to image selection section 106 as required.

Position management sever 103 receives and stores the camera IDs, position information and direction information transmitted from cameras 101, manages position information and direction information per camera in association with the camera ID and outputs the stored position information and direction information to camera extraction section 108 and camera position calculation section 109 as required.

Display image switching section 104 includes camera selection section 105, image selection section 106, object selection section 107, camera extraction section 108, camera position calculation section 109 and camera icon arranging section 110.

When the operator selects a camera icon displayed superimposed on an image picked up by camera 101 (camera image 12 displayed on the left side of monitoring screen 10 in FIG. 2A) or the operator selects an icon shown on a planar map displayed on display section 111, which will be described later (image displayed on the right side of monitoring screen 10 shown in FIG. 2), camera selection section 105 outputs camera selection information (e.g., camera ID) indicating which camera is selected to image selection section 106. Here, the following processing can be thought of as the processing that the operator selects a camera icon displayed superimposed on the image picked up by camera 101. That is, when the operator inputs coordinates on the screen using a pointer such as a mouse, camera selection section 105 may determine an icon corresponding to the input coordinates and camera ID corresponding to the icon from camera icon arranging section 110, which will be described later. Furthermore, as the processing that the operator selects a camera shown on the planar map displayed on display section 111, to be more specific, the camera ID corresponding to the position information of the selected camera on the planar map may be acquired from position management server 103 via a signal line (not shown).

Image selection section 106 reads image data of corresponding camera 101 from image management server 102 based on camera selection information output from camera selection section 105 and outputs the read image data to object selection section 107 and display section 111. Furthermore, image selection section 106 outputs the camera selection information output from camera selection section 105 to object selection section 107.

When the operator selects a object such as a figure or object existing in the image picked up by camera 101 selected by camera selection section 105, object selection section 107 generates object selection information indicating the selected object based on the image data output from image selection section 106 and outputs the information to camera extraction section 108. Furthermore, object selection section 107 acquires the camera ID of camera 101 selected by camera selection section 105 and outputs the camera ID to camera extraction section 108. The object selection information is coordinates on the screen of the object selected by the operator.

Camera extraction section 108 extracts camera 101 picking up an image of the object based on the object selection information and image data output from object selection section 107, the camera ID of camera 101 selected by camera selection section 105 and the position information and direction information of the camera acquired from position management server 103 and outputs the camera ID of extracted camera 101 to camera position calculation section 109. More specific camera extraction processing will be described later.

Camera position calculation section 109 reads position information corresponding to the camera ID output from camera extraction section 108 from position management server 103 and calculates the position on the image displayed on display section 111 using the read position information. The calculated position (coordinates) on the image is output together with the camera ID to camera icon arranging section 110.

Camera icon arranging section 110 manages camera icons in association with camera IDs and arranges the camera icons near the positions on the images calculated by camera position calculation section 109. Camera position calculation section 109 and camera icon arranging section 110 function as a camera position image information generation section that generates image information indicating the position of the extracted camera.

Display section 111 displays the camera icon arranged by camera icon arranging section 110 superimposed on the image selected by image selection section 106. Display section 111 displays monitoring screen 10 shown in FIG. 2.

Suppose the camera icon displayed in this way moves on the screen as the guard who picks up an image moves. That is, by updating processing at certain timing, the position of camera 101 is linked with the position of the icon and the camera icon moves in conjunction with the movement of camera 101. Furthermore, when the extracted camera no longer picks up an image of the selected object due to the movement of the guard, the camera icon is erased from the screen.

Figure 4:
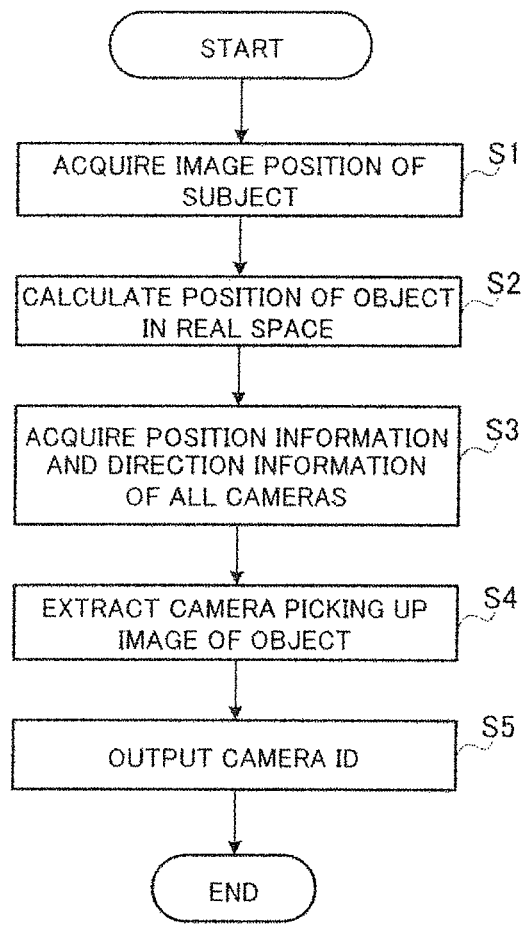
FIG. 4 is a flowchart showing a procedure of camera extraction processing by the camera extraction section shown in FIG. 3.

FIG. 4 is a flowchart showing a procedure of camera extraction processing by camera extraction section 108 shown in FIG. 3. In step S1 shown in FIG. 4, camera extraction section 108 acquires the position (object selection information) of the object selected by object selection section 107 on an image displayed on display section 111.

In step S2, camera extraction section 108 calculates the position of the object in the real space using the position of the object on the image acquired in step S1.

In step S3, camera extraction section 108 acquires position information and direction information of all cameras 101 stored in position management server 103.

In step S4, using the position information and direction information of all cameras 101 in acquired step S3, camera extraction section 108 extracts all cameras corresponding to angles formed by straight lines between the cameras and the object, and the optical axes of the cameras, which fall within a certain range from among all cameras 101. At this time, when the certain range=angle of view, cameras picking up images of the object are extracted. On the other hand, when the certain range<angle of view, cameras picking up images of the object near the center of the screen are extracted. This is because if the object is located at an edge of the image-pickup range of the camera, the displayed object may be hard to see or the object may be displayed in a way hard to see due to distortion of the lens, and therefore the certain range is further limited so as to extract cameras picking up images of the object near the center of the screen and acquire images suitable for monitoring.

Furthermore, a condition of extracting cameras corresponding to distances between the cameras and the object, which fall within a certain range, may also be added. By adding this condition, it is possible to avoid cameras located distant from the object from being extracted, and thereby extract only cameras picking up clear images of the object from short distances.

In step S5, the camera ID of camera 101 extracted in step S4 is output to camera position calculation section 109.

Here, the method of calculating the position of the object in a real space in above step S2 will be described. The position of the object in a real space is determined by the direction and distance with respect to a certain reference in the real space (here, selected camera 101). Therefore, the method of determining the direction of the object will be described first.

Figure 5:
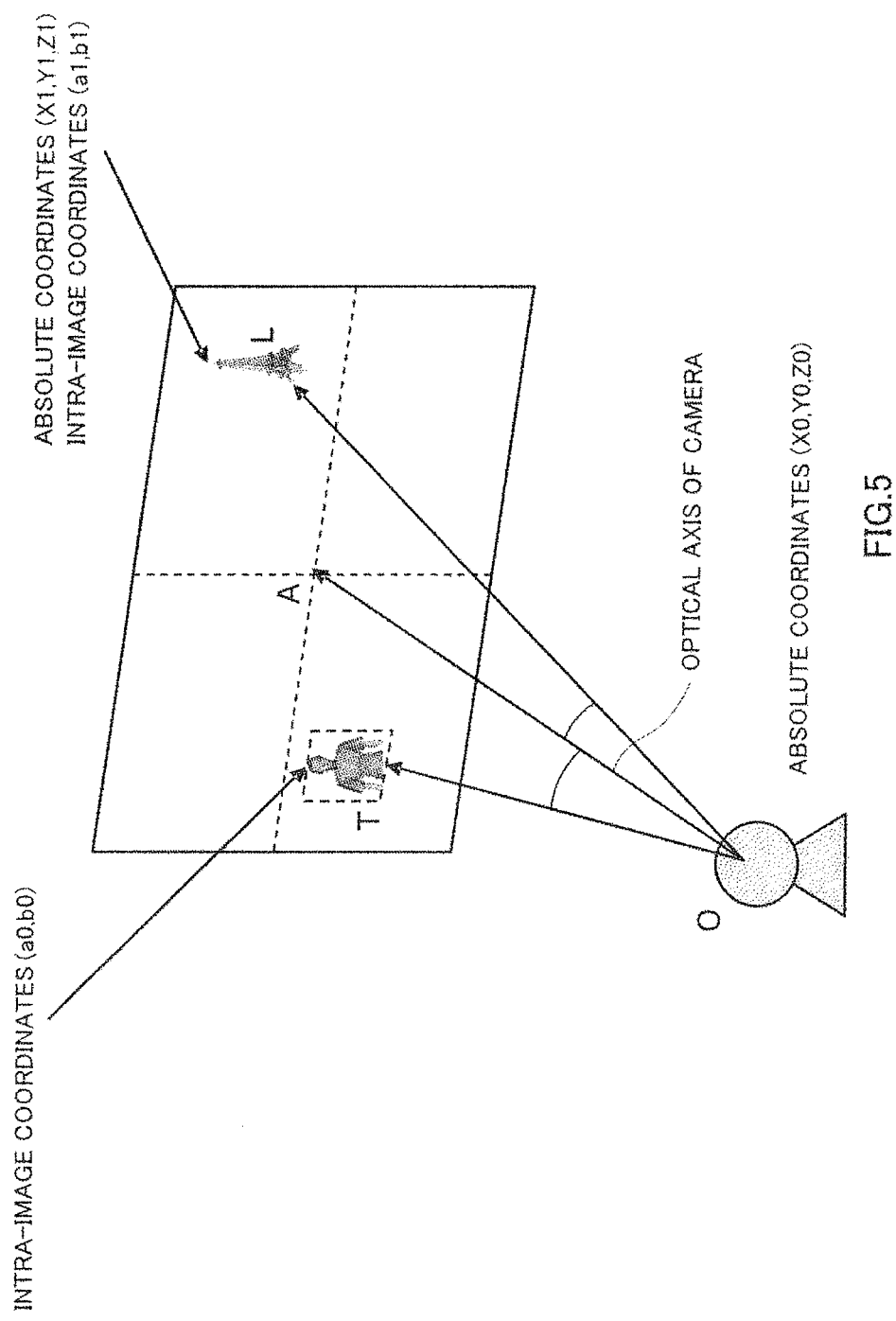
FIG. 5 is a schematic view schematically illustrating a relationship between a camera position and an intra-image position.

As shown in FIG. 5, suppose the position of selected camera 101 is O, an intersection with the optical axis within the image is A, the position of the object selected by the operator is T and the position of a landmark whose position is known beforehand is L. Camera 101 can acquire the direction of optical axis OA in the real space using a gyro and the value is assumed to be $(\theta, \varphi)$ using two declinations in a polar coordinate system.

Here, when the coordinates within the image (intra-image coordinates) are associated with a declination whose initial line is the optical axis as shown in FIG. 6 based on lens characteristics of camera 101, if the intra-image coordinates of the object are determined, $\angle AOT$ is uniquely determined. For example, when the intra-image coordinates of the object are $(a0, b0)$, $\angle AOT$ is determined to be $(\theta_0, \varphi_0)$.

Therefore, the direction of vector OT from position O of camera 101 to the object in the real space can be determined to be $(\theta+\theta_0, \varphi+\varphi_0)$, which is $\angle AOT$ added to the direction of optical axis OA in the real space.

Here, a minimum square frame including the object within the image may be arranged and coordinates of one vertex of the arranged square frame may be used or coordinates at a characteristic point such as the clearest point from a brightness distribution of the object may be used as the intra-image coordinates of the object. In short, the intra-image coordinates may be any coordinates of arbitrary one point representing the object.

Furthermore, the method of determining the direction of the object when no gyro is used such as when camera 101 is not provided with any gyro will be described. For example, when a landmark whose position in the real space is known beforehand exists in the image, this landmark may also be used to determine the direction of the object. To be more specific, assuming that the position of the landmark in the real space is absolute coordinates $(X1, Y1, Z1)$ and the position of camera 101 in the real space is absolute coordinates $(X0, Y0, Z0)$, the direction of line segment OL in the real space is calculated using a polar coordinate conversion equation as follows.

$$\left\{ \arccos \frac{Z_1 - Z_0}{\sqrt{(X_1 - X_0)^2 + (Y_1 - Y_0)^2 + (Z_1 - Z_0)^2}}, \right. \quad [1]$$

-continued $$\left. \arccos \frac{X_1 - X_0}{\sqrt{(X_1 - X_0) + (Y_1 - Y_0)^2}} \right)$$

Since declination ∠LOA with respect to the optical axis is determined to be $(\theta_1, \varphi_1)$ from intra-image coordinates (a1, b1) of the landmark in FIG. 6, the direction of optical axis OA in the real space is determined as follows.

$$\left( \arccos \frac{Z_1 - Z_0}{\sqrt{(X_1 - X_0)^2 + (Y_1 - Y_0)^2 + (Z_1 - Z_0)^2}} - \theta_1, \right.$$

$$\left. \arccos \frac{X_1 - X_0}{\sqrt{(X_1 - X_0) + (Y_1 - Y_0)^2}} - \varphi_1 \right) \quad [2]$$

Therefore, direction vector OT from camera 101 to the object can be determined in the same way as in the case where a gyro is used. Suppose the method of determining intra-image coordinates of the landmark is similar to the above-described method of determining intra-image coordinates of the object.

Next, the method of calculating the distance between camera 101 and the object will be described. When the size of the object in the real space is determined, based on the lens characteristic of camera 101, if the area size of the object within the image is associated with the distance to the object as shown in FIG. 7, the distance to the object is uniquely determined when the area size in the image of the object is determined. When a minimum square frame including the object within the image is arranged, the area size of the object within the image may be represented by the width and height of the square frame arranged.

Assuming that the object is a figure, this association may be determined beforehand through calculations from an experiment or camera characteristics. Even when the object is an object or animal other than a figure, it is also possible to associate the area size of the object within the image with the distance to the object based on a general size thereof.

Figure 8:
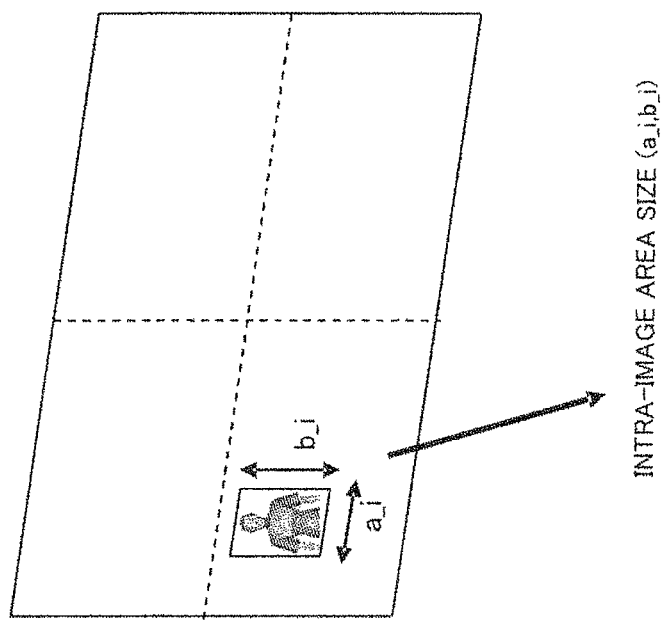
FIG. 8 shows an area size in the image of the object.

Here, for example, as shown in FIG. 8, when the area size of the object within the image is assumed to be (width, height)=(a_i, b_i), the distance to the object is determined to be r_i from the table shown in FIG. 7.

Thus, the position of the object in the real space can be identified by determining the direction and distance of the object with respect to camera 101 and camera extraction section 108 extracts camera 101 picking up an image of the object using the determined position of the object in the real space.

Regarding the camera position calculation processing by camera position calculation section 109, step S1 and step S2 in the camera extraction processing may be executed in the reverse order. To be more specific, the direction toward the extracted camera from the camera performing image pickup is determined from the positions of the extracted camera and the camera performing image pickup in the real space. Next, intra-image coordinates corresponding to the direction can be determined from the table of correspondence shown in FIG. 6.

In processing step S1 to step S4 of camera extraction section 108, the camera ID is extracted using position information, but image recognition may also be used for the camera extraction processing by camera extraction section 108. Characteristic information of the selected object is calculated using image recognition and it is determined whether or not the same characteristic information as that of the selected object is included in images of other cameras stored in image management server 102. The camera picking up an image including the characteristic information can be determined to be a camera picking up an image of the selected object. This method may be used when the accuracy of the position information of the camera or measurement accuracy of the image-pickup direction is poor or may be used together with the position information and direction information of the camera.

Thus, according to Embodiment 1, when the operator selects a object in the image picked up by a selected wearable camera from among a plurality of wearable cameras and displayed on the screen, another wearable camera picking up an image of the selected object is extracted, a camera icon is displayed at the position of the extracted wearable camera on the image, and when the displayed camera icon is selected, an image picked up by the wearable camera corresponding to the selected camera icon is displayed on the screen.

This allows the operator to intuitively select a camera to be seen through an intuitive and easy-to-understand operation of selecting an icon while watching the monitoring screen. Furthermore, since there is no need for referring to the planar map when switching between cameras, it is possible to reduce the burden on the operator due to movement of the line of sight and continuously display a object of interest to the operator. Furthermore, since only cameras suitable for monitoring of a object are displayed with icons, it is possible to switch between cameras and improve operability.

Although the present embodiment has described a case where a planar map is displayed on the monitoring screen, the present invention is not limited to this; an image picked up by a selected camera may be displayed on the monitoring screen without displaying the planar map.

Furthermore, although the present embodiment has described a case where an extracted camera is indicated by a camera icon, the present invention is not limited to this; any icon indicating the extracted camera may be used, and further, the camera may be indicated by changing the display color, for example, by highlighting the display color of a guard attaching the extracted camera in reverse video instead of displaying an icon. In short, the extracted camera needs only to be displayed on the monitoring screen so as to be selectable.

Embodiment 2

A case has been described in Embodiment 1 where a camera icon of a camera picking up an image of a object selected by an operator is displayed, but the present embodiment will describe a case where as a condition of extracting a camera, a camera whose image is picked up is extracted in the camera image displayed on the left side of a monitoring screen and the extracted camera icon is displayed.

Figure 9:
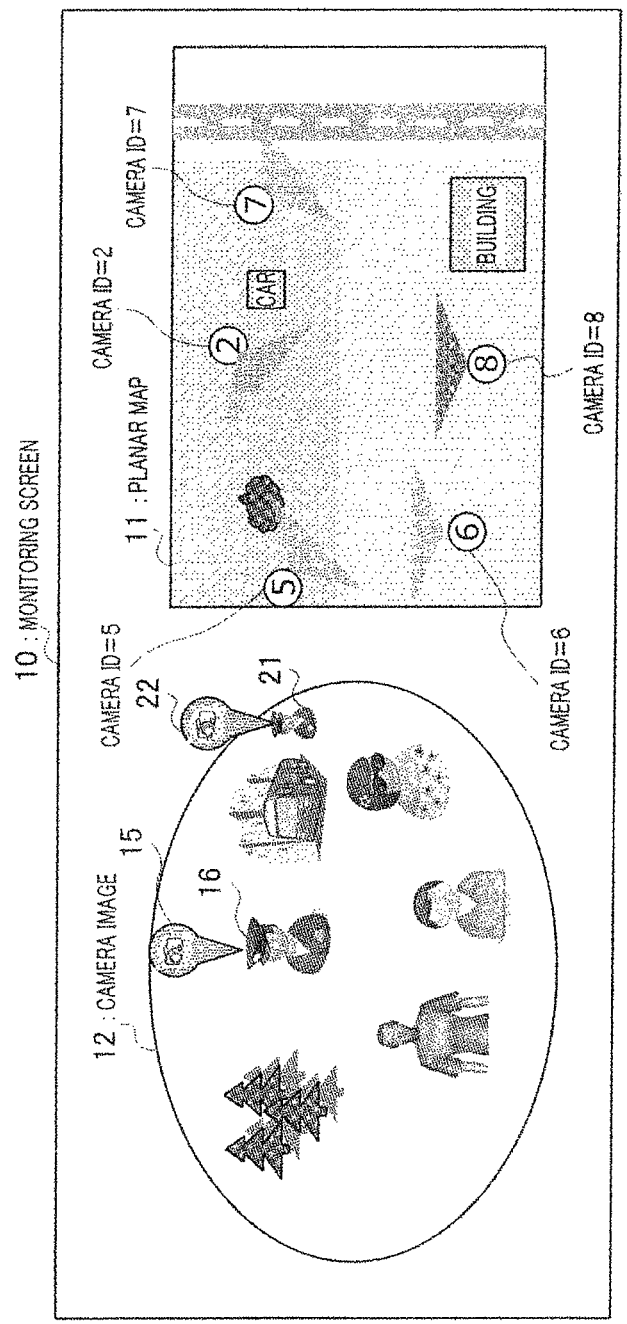
FIG. 9 is a conceptual diagram of an overview of a monitoring system of Embodiment 2.

FIG. 9 is a conceptual diagram of an overview of a monitoring system according to Embodiment 2 of the present invention. In this example, a camera image with camera ID=8 is currently displayed and cameras with camera ID=2 and camera ID=7 are included in the image-pickup range of this camera with camera ID=8. Furthermore, camera icon 15 representing camera ID=2 is displayed near guard 16 displayed in camera image 12 and camera icon 22 representing camera ID=7 is displayed near guard 21 displayed in camera image 12. Here, when the operator selects the camera icon with camera ID=2 or camera ID=7, camera image 12 on the left side of the monitoring screen is changed to the camera image with the selected camera ID.

Figure 10:
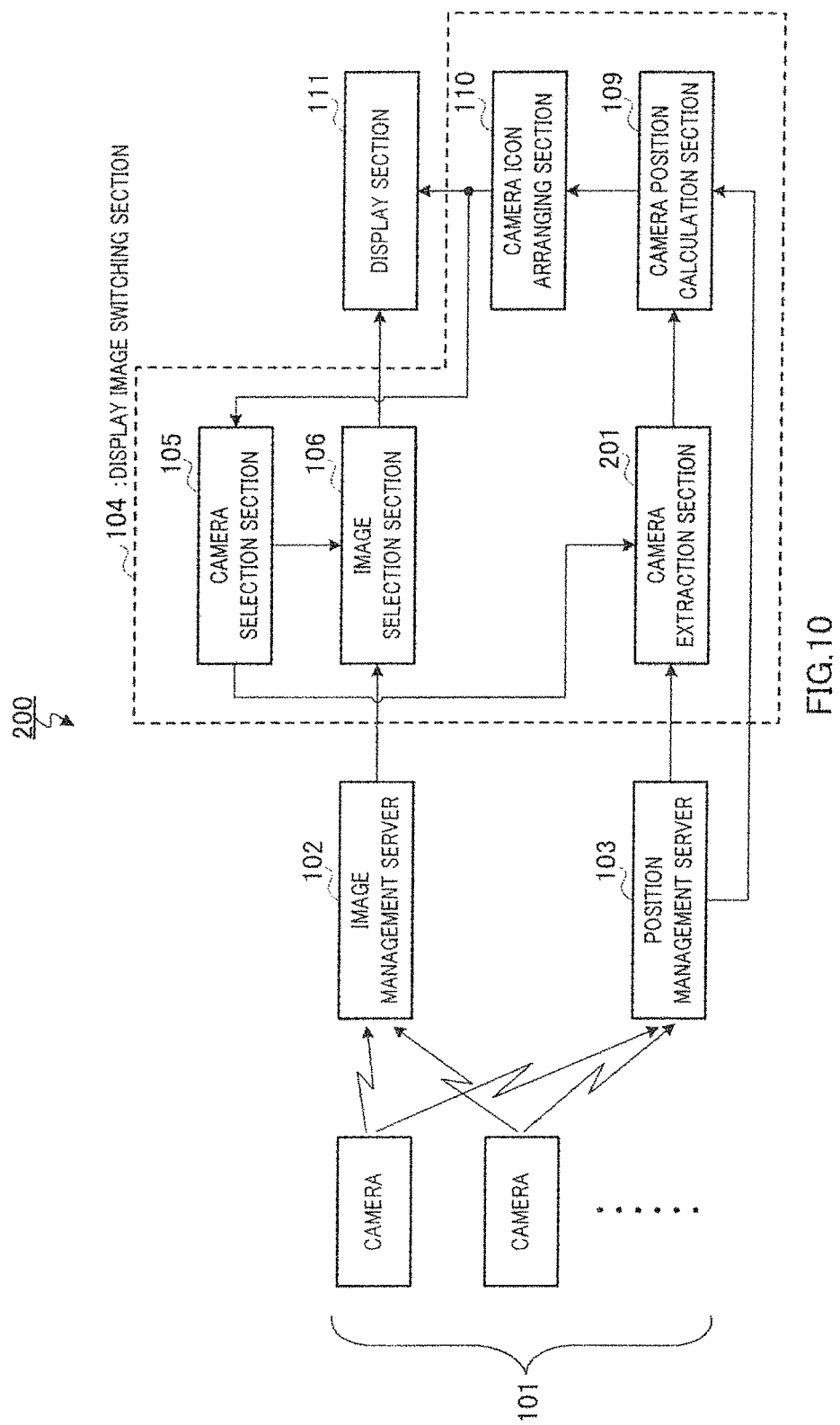
FIG. 10 is a block diagram of a configuration of the monitoring system of Embodiment 2.

FIG. 10 is a block diagram showing a configuration of monitoring system 200 according to Embodiment 2 of the present invention. However, in FIG. 10, components common to those of Embodiment 1 in FIG. 3 are assigned the same reference numerals as those in FIG. 3 and overlapping descriptions will be omitted. FIG. 10 is different from FIG. 3 in that object selection section 107 is deleted and camera extraction section 108 is changed to camera extraction section 201.

Camera extraction section 201 acquires a camera ID of a camera image currently displayed from camera selection section 105 and acquires position information and direction information of camera 101 corresponding to the acquired camera ID from position management server 103. Furthermore, camera extraction section 201 acquires position information and direction information of all cameras 101 stored in position management server 103 and extracts another camera 101 included in an image-pickup range of camera 101 picking up the image currently displayed based on position information and direction information of camera 101 picking up the image currently displayed and position information and direction information of all cameras 101.

Monitoring system 200 may perform image processing on the picked-up image currently displayed, extract a guard attaching camera 101 through image recognition and display a camera icon at the corresponding position.

Thus, Embodiment 2 extracts another wearable camera included in an image displayed on a screen from among a plurality of wearable cameras, displays a camera icon at a position in the image of the extracted wearable camera, and can thereby switch between monitoring images through a simple operation and improve operability.

Embodiment 3

An example of a case has been described in above-described Embodiments 1 and 2 where all cameras are wearable cameras, but the present invention is also effective in the case where all cameras are not wearable cameras but there are some stationary cameras. The present embodiment will describe an example of such a case.

The present embodiment will describe a case where the camera with camera ID=7 according to Embodiment 2 is a stationary camera.

Figure 11:
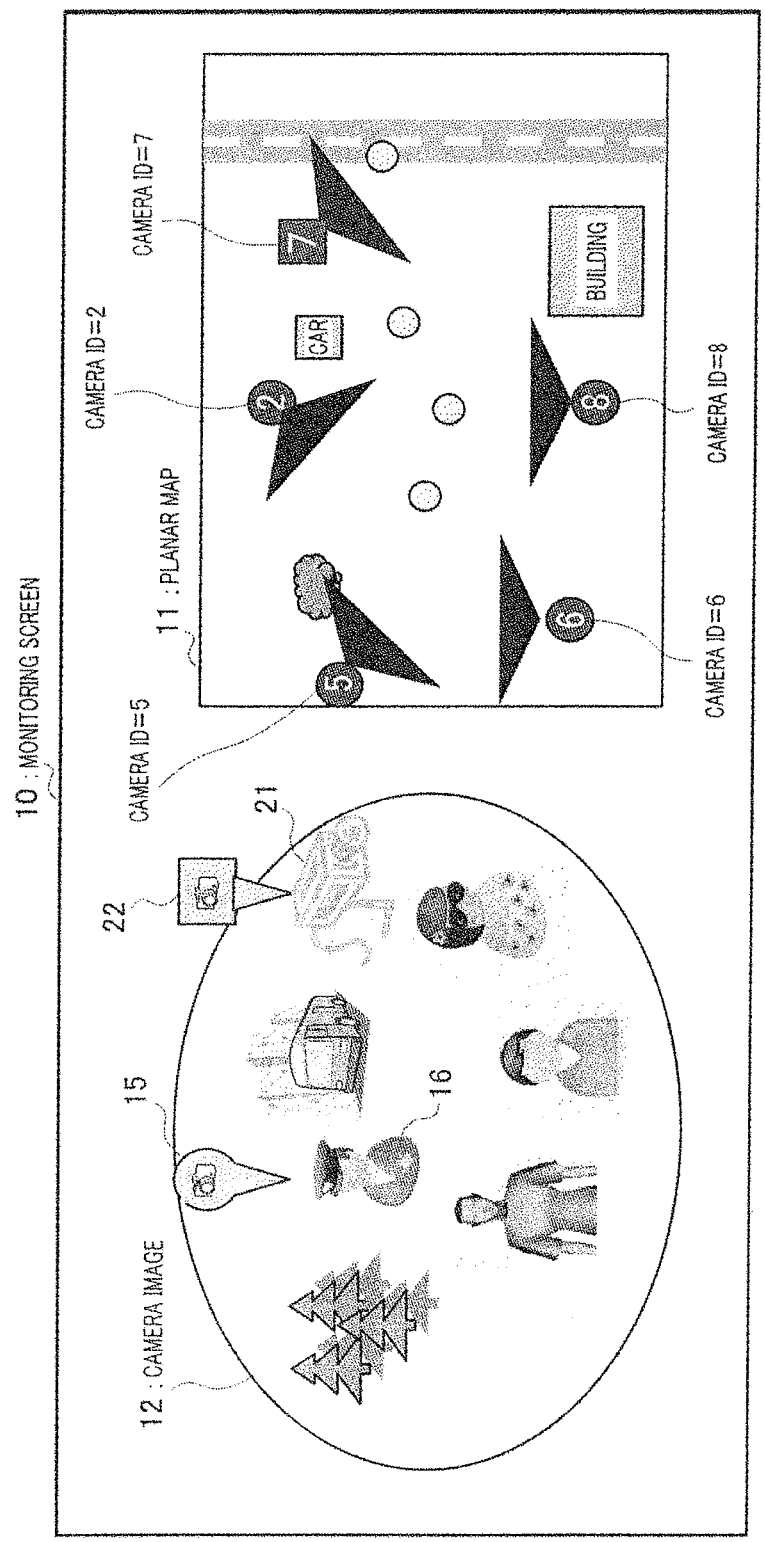
FIG. 11 is a conceptual diagram of an overview of a monitoring system of Embodiment 3.

FIG. 11 is a conceptual diagram of an overview of a monitoring system according to Embodiment 3 of the present invention. In this example, a camera image with camera ID=8 is currently displayed and an image-pickup range of this camera with camera ID=8 includes a wearable camera with camera ID=2 and a stationary camera with camera ID=7. Furthermore, camera icon 15 (circular icon) indicating a moving camera corresponding to camera ID=2 is displayed near guard 16 displayed in camera image 12 and camera icon 22 (rectangular icon) indicating a stationary camera corresponding to camera ID=7 is displayed near surveillance camera 21 displayed in camera image 12.

The operator can recognize stationary cameras distinctively from wearable cameras by referring to these icons.

Here, when the operator selects a camera icon with camera ID=2 or camera ID=7, camera image 12 on the left side of the monitoring screen is changed to the camera image with the selected camera ID.

Figure 12:
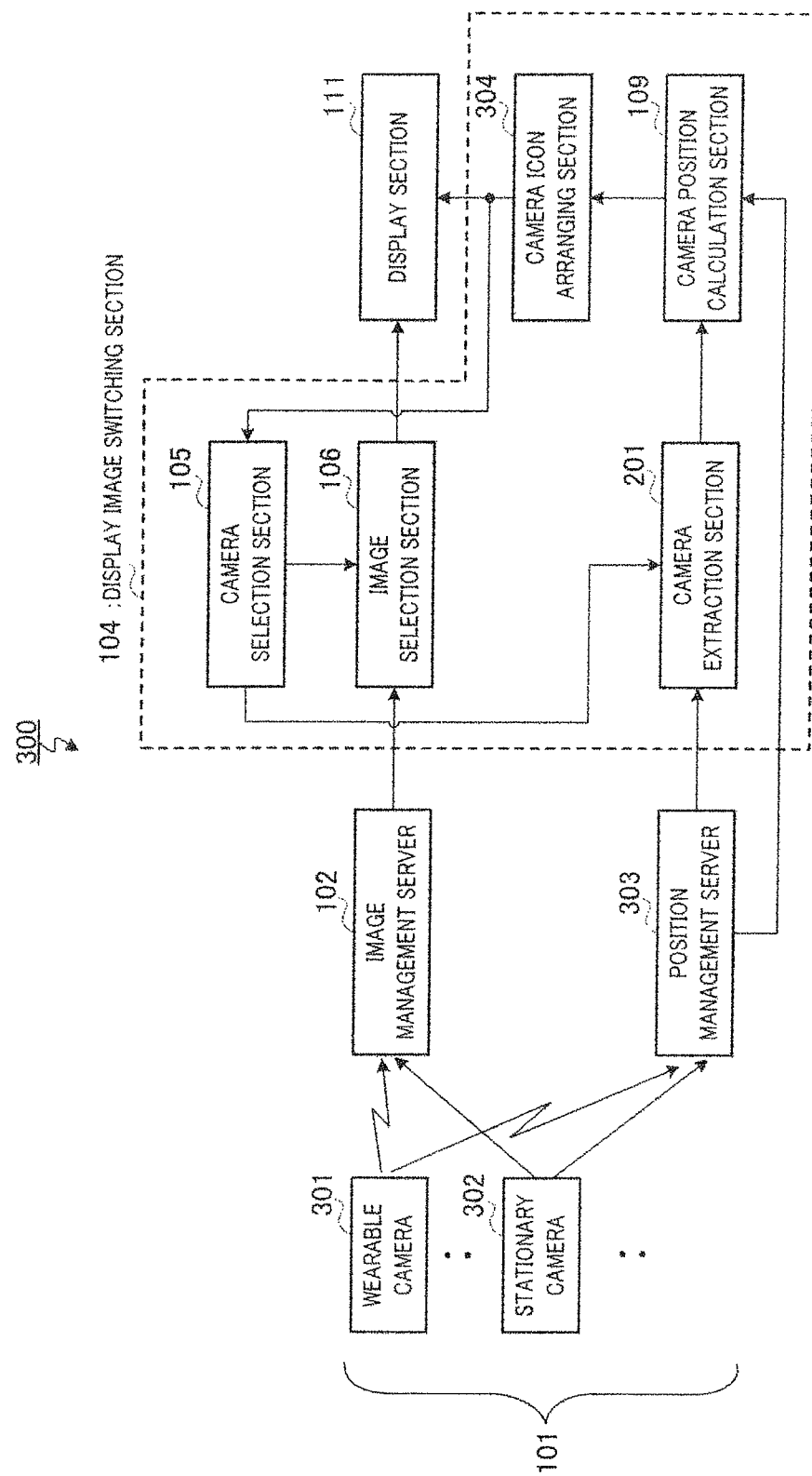
FIG. 12 is a block diagram of a configuration of the monitoring system of Embodiment 3.

FIG. 12 is a block diagram showing a configuration of monitoring system 300 according to Embodiment 3 of the present invention. However, in FIG. 12, components common to those of Embodiment 2 in FIG. 10 are assigned the same reference numerals as those in FIG. 10 and overlapping descriptions will be omitted. FIG. 12 is different from FIG. 10 in that there are two types of cameras; wearable camera 301 and stationary camera 302 as cameras 101 and position management server 103 is changed to position management server 303 and camera icon arranging section 110 is changed to camera icon arranging section 304.

Position management server 303 manages camera type information as to whether camera 701 is wearable camera 301 or stationary camera 302 in addition to the camera ID, position information and direction information transmitted from camera 101. Camera icon arranging section 304 determines the type of a camera icon based on camera type information managed by position management server 303.

Camera extraction section 201 may also be configured so as to be able to set an extraction condition according to the type of camera such as extracting only wearable cameras or extracting only stationary cameras.

Embodiment 4

A case has been described in above-described Embodiment 3 where extracted cameras include both a wearable camera and a stationary camera, but the present embodiment will describe an example of a case where a camera currently selected is a stationary camera and will thereby describe a display method taking into account differences in characteristics between stationary cameras and wearable cameras.

The present embodiment will describe a case where cameras with camera IDs=7 and 8 in Embodiment 2 are stationary cameras.

Figure 13:
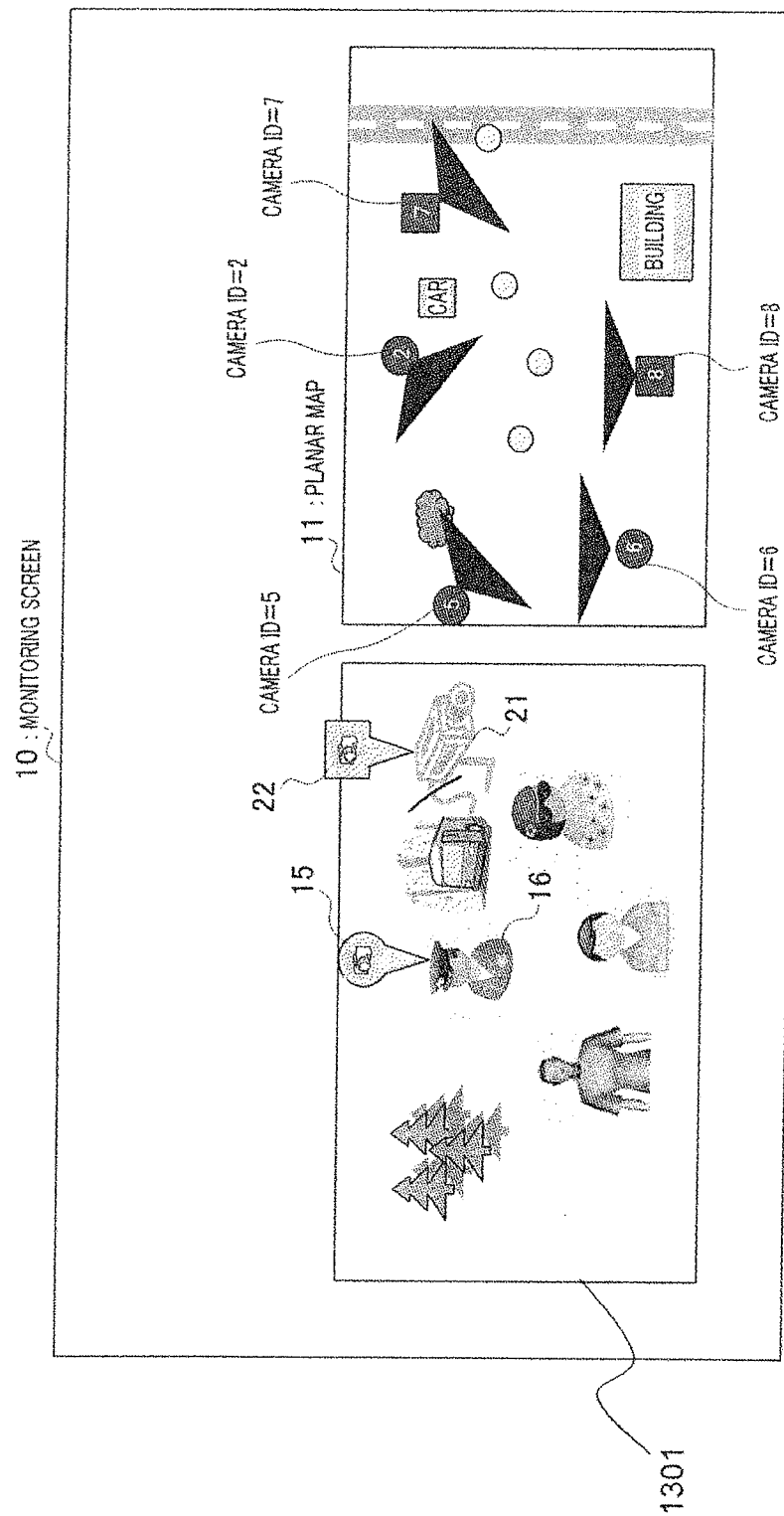
FIG. 13 is a conceptual diagram of an overview of a monitoring system of Embodiment 4.
Figure 14:
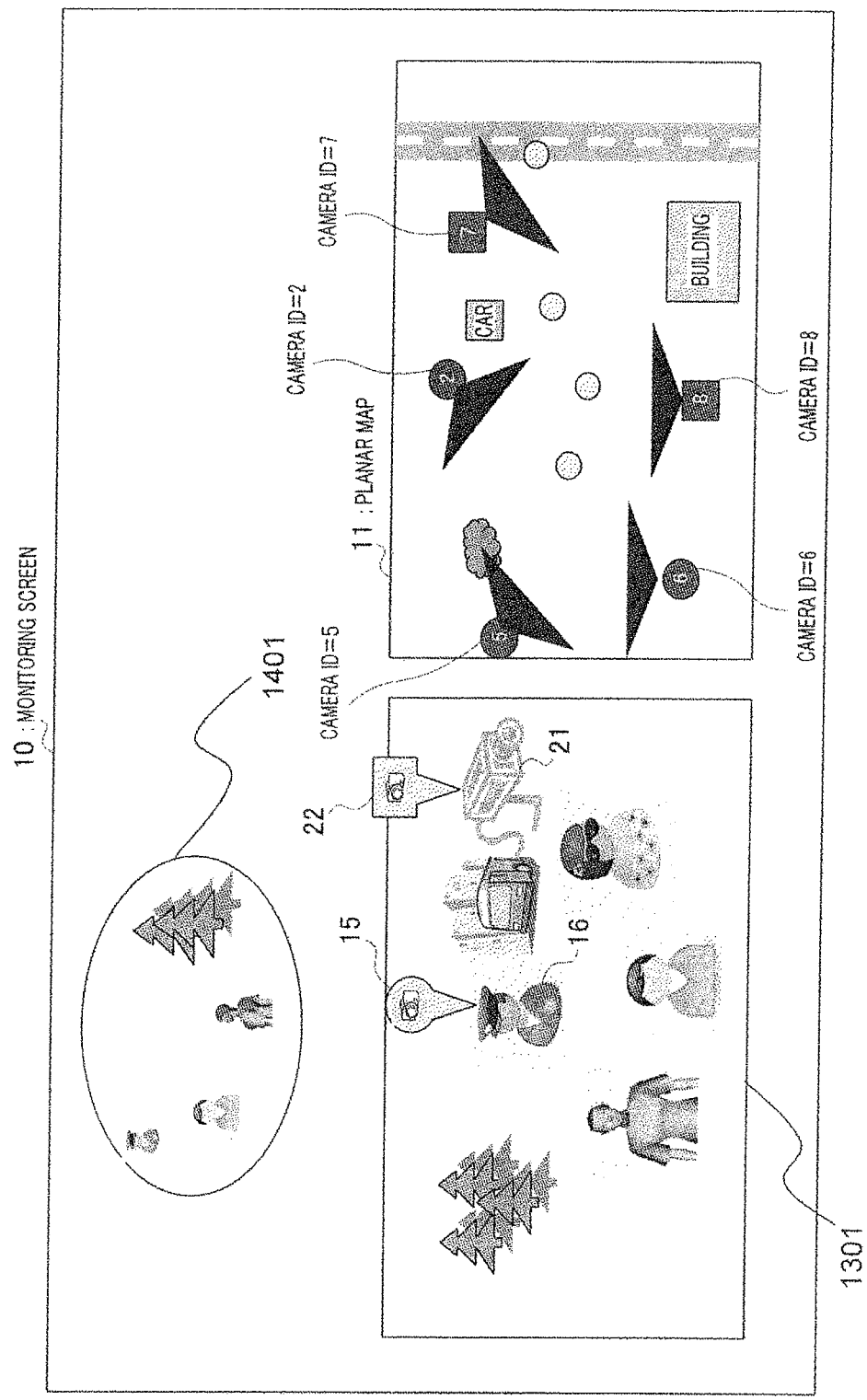
FIG. 14 is a conceptual diagram of an overview of the monitoring system of Embodiment 4.

FIG. 13 and FIG. 14 are conceptual diagrams of an overview of a monitoring system according to Embodiment 4 of the present invention. In this example, a camera image of a stationary camera with camera ID=8 is currently displayed. In the figure, a camera with camera ID=2 is a wearable camera and a camera with camera ID=7 is a stationary camera. The rest of display contents are similar to those of Embodiment 2.

When icon 22 of the stationary camera with camera ID=7 is selected, as shown in FIG. 13, area 1301 on the monitoring screen is changed to the video of the stationary camera with camera ID=7.

Here, when icon 15 of the wearable camera with camera ID=2 is selected, the video of the wearable camera with camera ID=2 is displayed as shown in FIG. 14 in area 1401 on the monitoring screen along with video 1301 of the stationary camera with camera ID=8 displayed until then.

Figure 15:
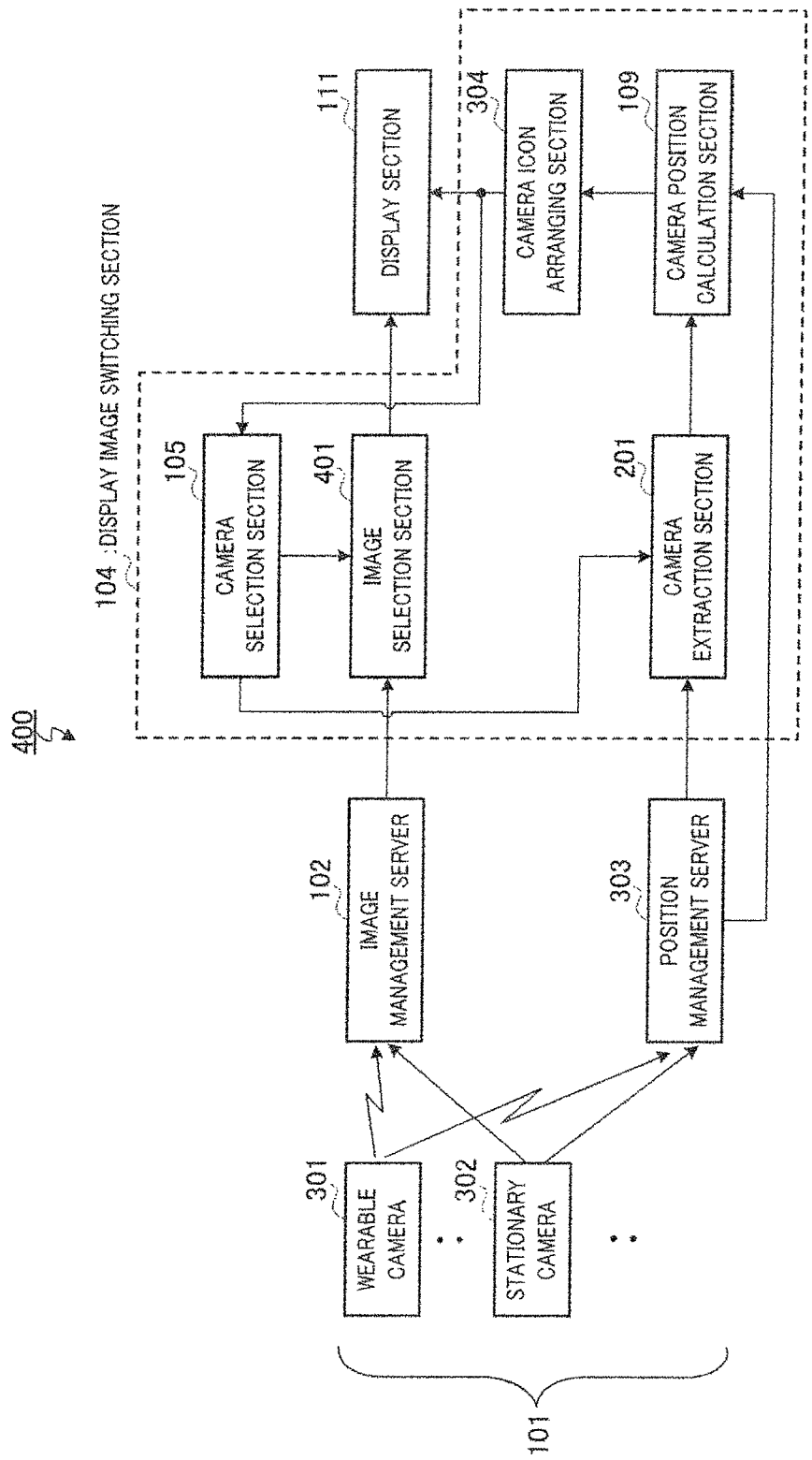
FIG. 15 is a block diagram of a configuration of the monitoring system of Embodiment 4.

FIG. 15 is a block diagram of a configuration of monitoring system 400 according to Embodiment 4 of the present invention. However, in FIG. 15, components common to those of Embodiment 3 in FIG. 12 are assigned the same reference numerals as those in FIG. 12 and overlapping descriptions will be omitted. FIG. 15 is different from FIG. 12 in that image selection section 106 is changed to image selection section 401.

Image selection section 401 changes the display mode depending on whether the selected camera is wearable camera 301 or stationary camera 302. To be more specific, when stationary camera 302 is selected, image selection section 401 changes the video (FIG. 13) and when wearable camera 301 is selected, image selection section 401 displays wearable camera video 1401 along with stationary camera video 1301 displayed until then (FIG. 14).

This allows wide-area monitoring using stationary cameras and detailed monitoring using wearable cameras to be realized simultaneously.

Other Embodiments

Although cases have been described with above Embodiments 1 to 4 as examples where the present invention is configured by hardware, the present invention can also be realized by software. For example, by writing an algorithm of the display method according to the present invention in a programming language, storing the program in memory and causing the information processing section to execute the program, it is possible to realize functions similar to those of the apparatus according to the present invention.

Further, if integrated circuit technology comes out to replace LSI's as a result of the advancement of semiconductor technology or a derivative other technology, is naturally also possible to carry out function block integration using this technology.

The disclosures of Japanese Patent Application No. 2009-246954, filed on Oct. 27, 2009 and Japanese Patent Application No. 2010-044182, filed on Mar. 1, 2010, including the specifications, drawings and abstracts are incorporated herein by reference in their entirety.

INDUSTRIAL APPLICABILITY

The display image switching apparatus and display method according to the present invention displays, when selecting a particular camera from among a plurality of wearable cameras, a wearable camera picking up an image of a object of interest to an operator as a selectable one on a monitoring screen, thereby has an effect of reducing the burden on the operator, and is applicable, for example, to a crime prevention system, monitoring system or the like.

REFERENCE SIGNS LIST

100, 200, 300, 400 monitoring system
101 camera
102 image management server
103, 303 position management server
104 display image switching section
105 camera selection section
106, 401 image selection section
107 object selection section
108, 201 camera extraction section
109 camera position calculation section
110, 304 camera icon arranging section
111 display section
301 wearable camera
302 stationary camera

The invention claimed is:

1. A display image switching apparatus comprising:
a processor;
a memory including instructions that, when executed by the processor, cause the processor to perform operations including:
displaying a first image picked up by a first camera of a plurality of cameras;
selecting an object in the displayed first image;
extracting a second camera from the plurality of cameras that picks up the object selected from the displayed first image, and not extracting a third camera from the plurality of cameras that does not pick up the object selected from the displayed first image, based on a position of the selected object in a real space and positions and optical axis directions of the plurality of cameras in the real space;
calculating a position of the second camera on the displayed first image picked up by the first camera, based on a position of the first camera in the real space and a position of the second camera in the real space; and
displaying a selectable image, indicating the extracted second camera, on the displayed first image picked up by the first camera, at the position of the second camera on the displayed first image, and not displaying a selectable image indicating the third camera that is not extracted by the processor, wherein:
when the selectable image which indicates the second camera and is displayed on the displayed first image is selected, the display displays a second image picked up by the second camera, the second image displaying the selected object which is displayed in the first image.

2. The display image switching apparatus according to claim 1, wherein the processor calculates the position of the selected object in the real space, and extracts the second camera from the plurality of cameras, when the position and an optical axis direction of the second camera in the real space satisfy a predetermined relationship with the position of the object in the real space.

3. The display image switching apparatus according to claim 2, wherein the processor extracts the second camera from the plurality of cameras, when an angle formed by the second camera and the object with respect to the optical axis direction of the second camera falls within a predetermined angle, which is set to a value less than an angle of view of the second camera.

4. The display image switching apparatus according to claim 2, wherein the processor extracts the second camera from the plurality of cameras, when a distance between the second camera and the object is within a predetermined distance.

5. The display image switching apparatus according to claim 1, wherein the processor calculates a characteristic value within an image of the selected object and extracts the second camera that picks up the image including the calculated characteristic value of the object.

6. The display image switching apparatus according to claim 1, wherein, when the second camera is located outside an image of the first camera, the processor changes an appearance of the selectable image, indicating the second camera.

7. The display image switching apparatus according to claim 1, wherein the processor changes a size of the selectable image indicating the second camera, according to a distance between the second camera and the first camera.

8. The display image switching apparatus according to claim 1, wherein the processor changes an appearance of the selectable image indicating the second camera, according to a photographing direction of the second camera viewed from the first camera.

9. The display image switching apparatus according to claim 1, wherein the first camera is a moving camera.

10. The display image switching apparatus according to claim 1, wherein the second camera is a moving camera.

11. The display image switching apparatus according to claim 1, wherein the processor changes a display mode of the selectable image, indicating the second camera, depending on whether the second camera is a moving camera or a stationary camera.

12. A display image switching method comprising:
displaying a first image picked up by a first camera of a plurality of cameras;
selecting an object in the displayed first image;
extracting a second camera from the plurality of cameras that picks up the object selected from the displayed first image, and not extracting a third camera from the plurality of cameras that does not pick up the object selected from the displayed first image, based on a position of the selected object in a real space and positions and optical axis directions of the plurality of cameras in the real space;
calculating a position of the second camera on the displayed first image picked up by the first camera, based on a position of the first camera in the real space and a position of the second camera in the real space;
displaying a selectable image, indicating the extracted second camera, on the displayed first image picked up by the first camera, at the calculated position of the second camera on the displayed first image, without displaying a selectable image indicating the third camera that is not extracted;
selecting the selectable image indicating the second camera displayed on the first image; and
displaying a second image picked up by the second camera when the selectable image which indicates the second camera and is displayed on the first image is selected, wherein the displayed second image displays the selected object which is displayed in the first image.

13. A non-transitory computer readable recording medium storing a display image switching program that, when executed, causes a computer to execute a process comprising:
displaying a first image picked up by a first camera of a plurality of cameras;
selecting an object in the displayed first image;
extracting a second camera from the plurality of cameras that picks up the object selected from the displayed first image, and not extracting a third camera from the plurality of cameras that does not pick up the object selected from the displayed first image based on a position of the selected object in a real space and positions and optical axis directions of the plurality of cameras in the real space;
calculating a position of the second camera on the displayed first image picked up by the first camera, based on a position of the first camera in the real space and a position of the second camera in the real space;
displaying a selectable image, indicating the extracted second camera, on the displayed first image picked up by the first camera, at the calculated position of the second camera on the displayed first image, without displaying a selectable image indicating the third camera that is not extracted;
selecting the selectable image indicating the second camera displayed on the first image; and
displaying a second image picked up by the second camera when the selectable image which indicates the second camera and is displayed on the first image is selected, wherein the displayed second image displays the selected object which is displayed in the first image.

14. The display image switching apparatus according to claim 1, further comprising:
a storage that stores a relationship between the position of the second camera on the displayed first image picked up by the first camera, and the position of the first camera in the real space and the position of the second camera in the real space,
wherein the processor calculates the position of the second camera on the displayed first image with reference to the relationship stored in the storage.

15. The display image switching apparatus according to claim 1, wherein the processor calculates coordinates indicating the position of the second camera on the displayed first image.

16. The display image switching apparatus according to claim 1, wherein the processor displays a selectable icon, indicating the second camera, on the displayed first image picked up by the first camera.

* * * * *